United States Patent
Lee et al.

(10) Patent No.: US 7,342,603 B2
(45) Date of Patent: Mar. 11, 2008

(54) IMAGE OUTPUT TEST SYSTEM AND METHOD AND DEVICE THEREOF

(75) Inventors: Wei-Ming Lee, Taipei (TW); Jia-Chuan Chen, Taipei (TW); Song Liou, Tianjin (CN); Peng Wang, Tianjin (CN)

(73) Assignee: Inventec Corporation, Taipei (TW)

( * ) Notice: Subject to any disclaimer, the term of this patent is extended or adjusted under 35 U.S.C. 154(b) by 555 days.

(21) Appl. No.: 10/994,473

(22) Filed: Nov. 23, 2004

(65) Prior Publication Data

US 2006/0109348 A1    May 25, 2006

(51) Int. Cl.
*H04N 17/02* (2006.01)
*G06F 19/00* (2006.01)

(52) U.S. Cl. .................. 348/180; 348/189; 702/120

(58) Field of Classification Search .............. 348/180, 348/184, 189, 192, 572, 177; 702/120–122, 702/117; 324/76.42, 76.58; 714/726, 732, 714/735, 738, 742

See application file for complete search history.

(56) References Cited

U.S. PATENT DOCUMENTS

| | | | |
|---|---|---|---|
| 5,066,909 A * | 11/1991 | Firooz | 324/158.1 |
| 5,568,493 A * | 10/1996 | Morris | 714/726 |
| 5,748,124 A * | 5/1998 | Rosenthal et al. | 341/120 |
| 5,982,743 A * | 11/1999 | Kusano | 370/217 |
| 6,405,147 B1 * | 6/2002 | Fera | 702/112 |
| 6,498,999 B1 * | 12/2002 | Reise | 702/120 |
| 6,584,432 B1 * | 6/2003 | Holzinger et al. | 702/188 |
| 6,931,579 B2 * | 8/2005 | Roberts et al. | 714/724 |
| 7,110,905 B2 * | 9/2006 | Le et al. | 702/118 |
| 2004/0075766 A1 * | 4/2004 | Schoner | 348/500 |
| 2004/0102917 A1 * | 5/2004 | Chen et al. | 702/120 |

* cited by examiner

*Primary Examiner*—Victor R. Kostak
(74) *Attorney, Agent, or Firm*—Bacon & Thomas, PLLC

(57) ABSTRACT

The present invention is to provide an image output test system, which is built in between an image output device and an image output test device, in which the image output test device can receive a first video signal, convert the first video signal into a second video signal and further proceed sampling on the second video signal for acquiring a sampling result, and the image output device can output the first video signal through an image output terminal thereof, receive the sampling result from the image output test device, and compare the sampling result with a preset reference value to determine whether the image output terminal is good or not.

6 Claims, 3 Drawing Sheets

IMAGE OUTPUT TEST SYSTEM AND METHOD AND DEVICE THEREOF

FIELD OF THE INVENTION

The present invention relates to a test system, more particularly to an image output test system which is built in between an image output device and an image output test device, enabling the image output device to determine whether an image output terminal thereof is good or not.

PRIOR ART OF THE INVENTION

All the early-day televisions are equipped with antenna input port only, however, the newer model of televisions can provide composite video input and output terminals (Video In, Video Out) to directly input and output the demodulated video signal. As video signal no longer contains high-frequency component and is thus easier in terms of processing. Therefore, the video graphics adapters of computer all utilize the video input terminal to acquire video signal in general. Moreover, because the video signal no longer contains audio signal, the audio input and output terminals are bundled with the video input and output terminals to enable synchronous audio signal transmission. Hence, the composite video interface can be termed as AV (Audio Video) terminal. Whereas, the brightness and hue of composite video signal are combined together and it is difficult to maintain the original colors consistently during playback of the signal, adding that such composite video signal can only allows 240 scan lines.

The existing televisions are also provided with a two-component video input (S-Video in) port capable of outputting a two-component video signal. It separates brightness and hue signals into two paths of independent signals. Signal using two separate wires for transmission can be recorded as two different magnetic traces on analog tape. Such signal not only enables wider bandwidth for its brightness and hue and also reduces the mutual interference and increases up to 420 scan lines as a result of separate transmission of brightness and hue so that the two-component video signal can reappear better colors than the composite video signal. As such, the S-video terminal becomes one of the standard options of the latest video equipment such as the television with analog video capture/edit card, the TV box/TV card for semi-professional monitor and the video projector to facilitate the transmission of two-component video signals of video equipment to TV for image output.

To determine if the S-Video terminal is good by testing the correctness of the output signal of the S-Video terminal of the video equipment, regular video equipment manufacturer usually employs a transmission line connected between the S-Video terminal of the video equipment and the S-Video terminal of a TV. The video equipment further requests to sequentially transmit the two-component video signal with different colors from its S-Video terminal to the S-Video terminal of the TV, allowing TV to present assorted images with different colors. If the colors of image presented by the TV mismatch the colors of the two-component video signal issued by the S-Video terminal of the video equipment, the S-Video terminal of the video equipment can be deemed as being defected, Due to the limitation of cost and size of TV, the quality test regarding the S-Video terminal of the video equipment can be performed by a test station, which is additionally set up only after being gathered to the integration department for assembly. In case of defected product, the entire video equipment needs to be taken apart to proceed maintenance, causing the man-hour waste and damage to other components during the disassembling process.

SUMMARY OF THE INVENTION

In view of the said various drawbacks, being through livelong research and experiment, the inventor finally designs and develops an image output test system, method and device so as to contribute society by virtue of the disclosure of the invention.

One object of the invention targets at providing an image output test system, which is built in between an image output device and an image output test device, in which the image output test device can receive a first video signal, convert the first video signal into a second video signal and further proceed sampling on the second video signal for acquiring a sampling result, and the image output device can output the first video signal through an image output terminal thereof, receive the sampling result from the image output test device, and compare the sampling result with a preset reference value to determine if the image output terminal is good.

Another object of the invention targets at providing an image output test method, in which an image detection software. The image output device goes through the image output terminal to connect with an image output test device and the image output test device goes through one of its signal output terminal to further connect to one data transmit terminal of the image output device so that the image output device executes the image detection software and then the image output terminal will output a first video signal to the signal input terminal, enabling the image output test device to convert the first video signal into a second video signal, to acquire a sampling result from the second video signal. Subsequently, the signal output terminal transmits the sampling result to the data transmit terminal. Meanwhile, the image output device utilizes the one reference value set up by the image detection software to compare with the sampling result and record as a comparison result. If the comparison result shows that the reference value mismatches with the sampling result, the image output device will output a message failing to pass the test, or the image output device will output a message passing the test. Consequently, the image output terminal can be tested if it is good.

One more object of the invention targets at providing an image output test device, which comprises a video conversion module, at least one sampling module, a control module, one signal input terminal and a signal output terminal, in which the control module can control actions of those modules, the signal input terminal can receive a first video signal from an image output terminal of an image output device and further transmit to the video conversion module to convert the first video signal into a second video signal, the sampling module samples the second video signal in accordance with the command for controlling the modules to obtain a sampling result and transmits the sampling result to the control module, and the control module further transmits the sampling result to one data transmit terminal of the image output device through the signal output terminal, making the image output device perform the following processing based on the sampling result to test if the image output terminal is good.

The above and other objects, features and advantages of the present invention will become apparent from the following detailed description taken in conjunction with the accompanying drawings.

DESCRIPTION OF THE PREFERRED EMBODIMENT(S)

Figure 1:
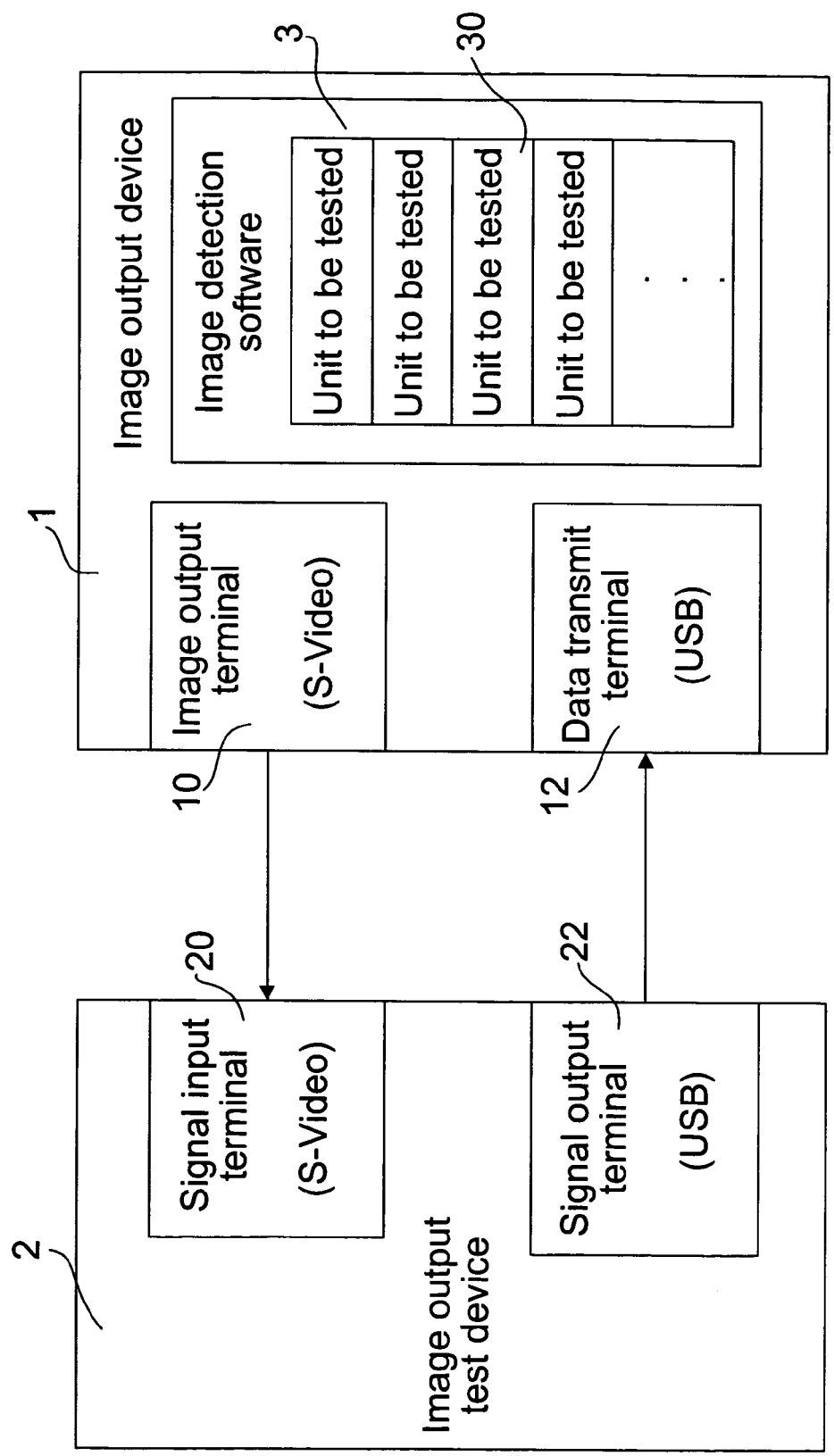
FIG. 1 is the schematic diagram of the invention for the system structure.

The invention relates to an image output test system, method and device as shown in FIG. 1. The image output test system is built in between an image output device 1 and an image output test device 2, in which one image output terminal 10 equipped in the image output device 1 can output a first video signal, the image output test device 2 can receive the first video signal, convert the first video signal into a second video signal and further sample the second video signal for acquiring a sampling result, the image output test device 2 further transmits the sampling result to one data transmit terminal 12 equipped in the image output device 1 and the image output device 1 further compare one reference value with the sampling result to determine if the image output terminal 10 is good.

Figure 2:
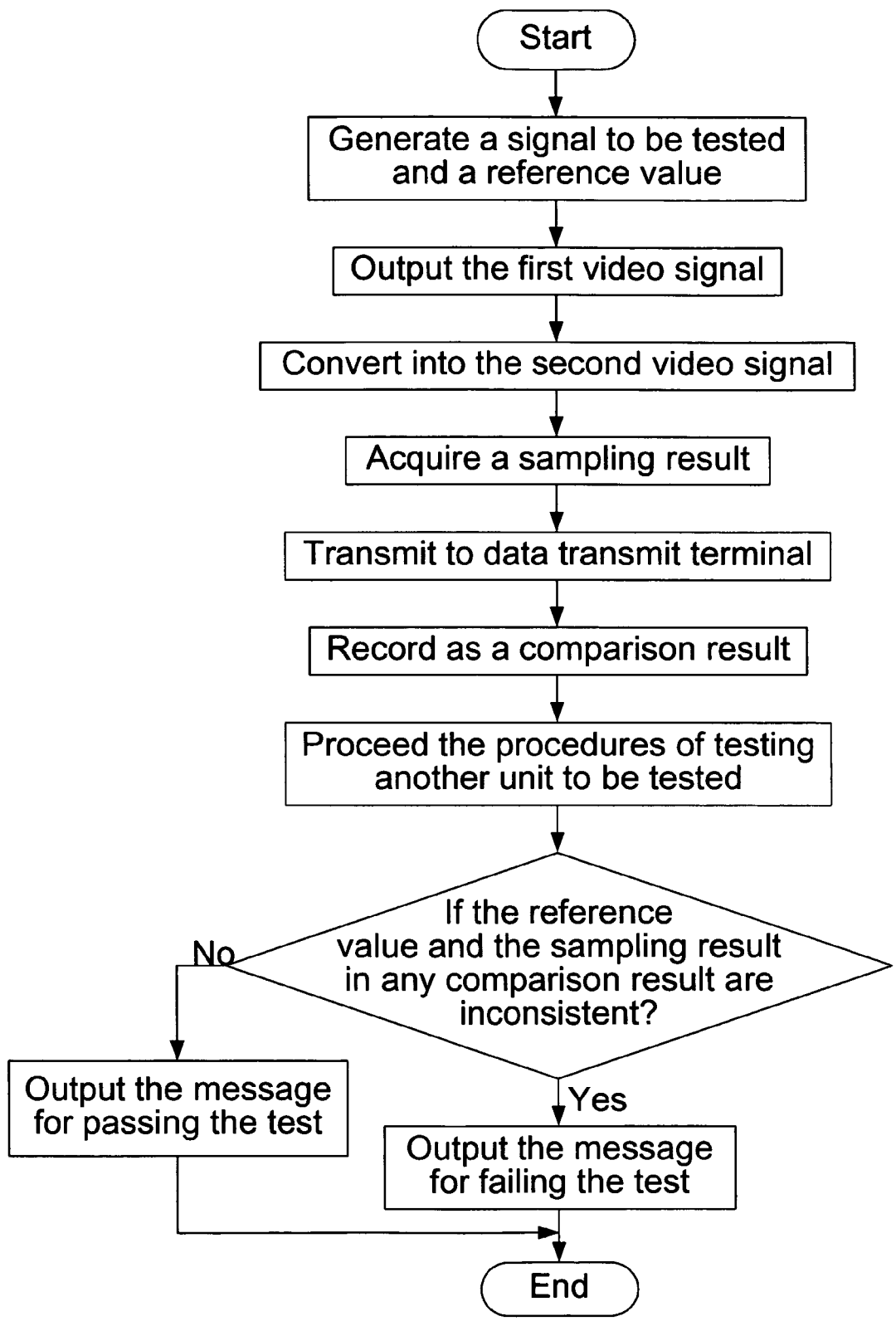
FIG. 2 is the action flow chart of the invention.

The invention relates to an image output test method as shown in FIG. 1 and FIG. 2, which contains an image detection software 3 in an image output device 1. The image detection software 3 comprises at least a unit to be tested 30 so that the image output device 1 can sequentially generate a signal to be tested and a reference value respectively based on the unit to be tested 30 after executing the image detection software 3. In addition, the image output device 1 goes through the image output terminal 10 to connect with a signal output terminal 20 equipped in an image output test device 2, One signal output terminal 22 equipped in the image output device 2 is further connected to one data transmit terminal 12 equipped in the image output device 1 so that the image output device 1 generates the corresponding signal to be tested and reference value based on the current unit to be tested 30 and then the image output terminal 10 will output a first video signal. Further acquire a sampling result from the second video signal until the signal input terminal 20 receives a first video signal and the image output test device 2 converts the first video signal into a second video signal. Subsequently, the signal output terminal 22 transmits the sampling result to the data transmit terminal 12. The image output device 1 compares the reference value with the sampling result to record a comparison result. Then the image output device 1 further output a first video signal from the image output terminal 10 based on another unit to be tested 30 until the procedure for recording a comparison result starts processing. After all the units to be tested 30 are done with processing, the image output device 1 further utilizes the image detection software 3 to determine if there is any comparison result having inconsistent sampling result with the reference value in the comparison result. If yes, the image output device 1 outputs a message for failing to pass, or the image output device 1 outputs a message passing the test. As such; the image output terminal 10 can be tested if it is good.

Figure 3:
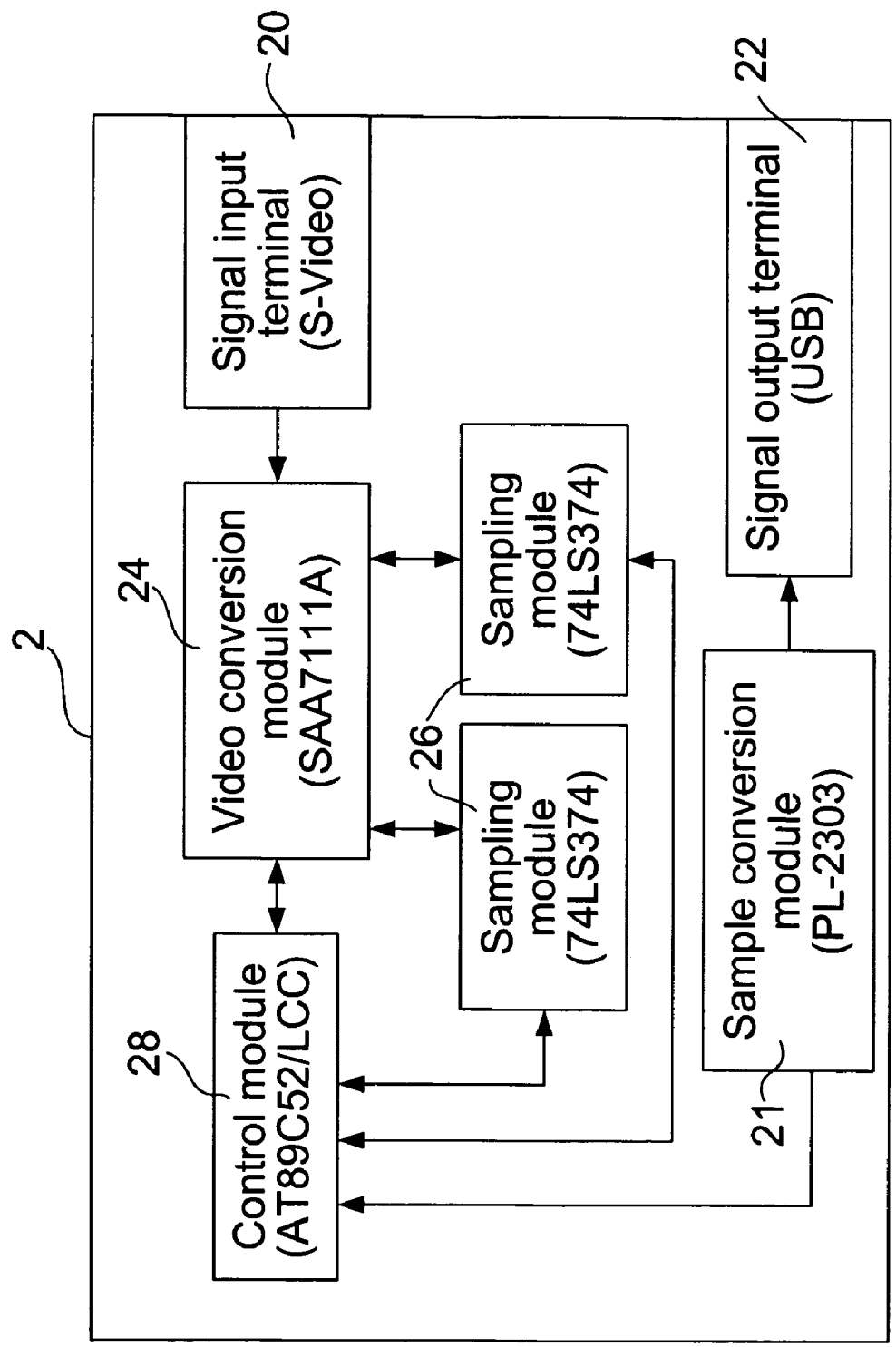
FIG. 3 is the schematic diagram of the invention for the structure of the image output test device.

The invention relates to an image output test device as shown in FIG. 3. The image output test device 2 comprises a signal input terminal 20, a signal output terminal 22, a video conversion module 24 and at least a sampling module 26 and a control module 28, in which the control module can control the actions of those modules, the signal input terminal 20 can receive a first video signal from one image output terminal 10 of an image output device 1 and transmit to the video conversion module 24, the video conversion module 24 converts the first video signal into a second video signal, and the sampling module 26 proceeds sampling with respect to the second video signal based on the command of the control module 28 for acquiring a sampling result and transmits the sampling result to the control module 28 and the control module 28 further transmit the sampling result to one data transmit terminal 12 of the image output device 1 through the signal output terminal 22. As a result, the image output device 1 can determine if the sampling result complies with a reference value designated by the image output device by comparing them. If yes, the image output terminal can be judged as good product, otherwise, the image output terminal can be judged as defected product.

In the invention the image output test device 2 is also installed with a sample conversion module 21. The sample conversion module 21 in connection with the control module 28 can convert the sampling result transmitted to the control module 28 into a transmission interface format (e.g. USB interface format) in compliance with that of the image output device 1. The structure design of the signal output terminal 22 is the format complying with the transmission interface format. Hence, the image output test device 2 can facilitate the image output test device 2 to transmit the sampling result to the data transmit terminal 12 through the signal output terminal 22 by means of the sample conversion module 21 capable of converting to the interface format complying with different transmission and the structure design of the signal output terminal 22 complying with the specifications of different transmission interface capable of being converted by the sample conversion module 21.

In the invention the signal input terminal 20 may be S-Video, which can transmits-Video Y/C signal, the video conversion module 24 can convert the S-Video Y/C signal into RGB 565 signal, meanwhile, the video conversion module 24 can follow the output position of the horizontal sync output signal and vertical reference signal to make the sampling position located at the center of each scan line and is used to get away the vertical blank section and issue command, allowing the sampling module 26 to proceed sampling at the center point of each scan line corresponding to the second video signal.

To understand how the image output device 1 and the image output test device 2 of the invention mutually transmit signal during actual operation, how the image output device 1 utilizes the image detection software 3 to complete detection and determine if the image output terminal 10 is good, here is the description of a practical implementation example as follows. In the example, the image output device 1 is a notebook computer main board, which is connected to all parts, such as hard disk drive, memory, display panel, CPU, graphics card, S-Video connector, USB connector and so forth, enabling the normal operation of the main board. The first video signal transmitted by the S-Video connector is the S-Video Y/C signal and the all parts of the image output test device 2 are in the following:

1. The video conversion module 24 may be the chip of model number SAA7111A manufactured by Philips 2. The sampling module is the chip of model number 74LS374. Two such sampling modules are used in practical implementation example.

3. The control module 28 is the chip of model number AT89C52/LCC.

4. The signal input terminal 20 is the S-Video connector.

5. The signal output terminal 22 the USB connector.

6. The sample conversion module 21 is the chip of model number PL-2303.

After the main board initiates the image detection software 3 stored in the hard disk, the main board sequentially generate black, red, green, blue and white colors of the signal to be tested and reference value in accordance with the black, red, green, blue and white colors of the unit to be tested preset by the image detection software 3. The main board sequentially sends out the black, red, green, blue and white S-Video Y/C signal in accordance with the signal to be tested.

Moreover, the image output test device 2 can sequentially receive the black, red, green and white S-Video Y/C signal from the S-Video connector equipped in the image output test device 2. After the AT89C52/LCC chip receives each one kind of color S-Video Y/C signal, it will go through L2C format to write in command to the SAA7111A chip, requesting that the SAA7111A chip converts the received one kind of S-Video Y/C signal into the corresponding RGB565 signal (the second video signal). Meanwhile, the AT89C52/LCC controls the two 74LS374 chips to proceed sampling with respect to current RGB565 and alternatively returns the individually sampling result to the AT89C52/LCC chip. Later the AT89C52/LCC chip transmits the sampling result to the PL-2303 chip to convert the sampling result into USB format by virtue of the PL-2303 chip for further being transmitted to the USB connector of the main board through the USB connector of the image output test device 2. After the main board employs the image detection software 3 to finish the comparison of the sampling result and the reference value, then proceed next comparison of the unit to be tested.

In the actual implementation example, after the black, red, green, blue and white RGB signals are sampled, the sampling result possesses respective specific value representation, for example, the reference value of the black unit to be tested shall be 0x00 and the reference value of the white unit to be tested shall be 0xFF. If the black unit to be tested preset by the image detection software 3 enables the main board to generate black signal to be tested, requesting to send out the black S-video Y/C signal from the S-video connector. Whereas, the sampling result for comparison returned to the image output test device 2 is not the reference value 0x00 of the black unit to be tested so that the image detection software 3 will record as a comparison result with inconsistent sampling result of the black unit to be tested and the reference value. After the image detection software 3 finishes all the tests, it will identify at least one mistake presenting in those comparison results, allowing the display panel in connection with the main board to display the message for failing to pass the test. For example, display "FAIL" word on the display panel. Otherwise, after the image detection test software 3 finishes all the tests, those comparison results are determined to be normal. Then the display panel in connection with the main board displays the message for passing the test. For example, display "PASS" word on the display panel.

While the invention has been described by means of specific embodiments, numerous modifications and variations could be made thereto by those skilled in the art without departing from the scope and spirit of the invention set forth in the claims.

What is claimed is:

1. An image output test method for an image output device installed with an image detection software, wherein the image detection software comprises at least one unit to be tested, the image output device is connected with an image output test device via an image output terminal of the image output device, the image output test device is further connected with a data transmit terminal of the image output device via a signal output terminal of the image output test device, so that after the image output device executes the image detection software, the processes proceeded between the image output device and the image output test device comprises the steps of:

Firstly, the image output device generates a S-Video Y/C signal and a reference value corresponding to a unit to be tested;

then the image output terminal of the image output device outputs the S-Video Y/C signal;

after a S-Video of the image output test device receives the S-Video Y/C signal, the S-Video Y/C signal is converted into a RGB565 signal;

the image output test device further acquires a sampling result from the RGB565 signal;

then the signal output terminal of the image output test device transmits the sampling result to the data transmit terminal of the image output;

the image output device compares the reference value with the sampling result to record as a comparison result;

then the image output device further generates another S-Video Y/C signal and another reference value corresponding to another unit to be tested, and outputs another S-Video Y/C signal to the image output test device until finishing the processes for obtaining another record of another comparison result; and after all units are tested, the image output device utilizes the image detection software to determine whether the reference value and the sampling result in any comparison result are inconsistent, if yes, the image output device outputs a message for failing to pass the test.

2. The method as claimed in claim 1, wherein the image output device will output a message for passing the test when the reference value and the sampling result in any comparison result are consistent.

3. An image output test device comprising:
a control module configured to control an action of a module connected thereto;
a S-Video connector configured to receive a S-Video Y/C signal from an image output terminal of an image output device;
a video conversion module configured to receive the S-Video Y/C signal from the S-Video connector and converting the S-Video Y/C signal into a RGB565 signal;
at least a sampling module configured to process sampling with respect to the RGB565 signal at the center point of each scan line thereof according to command issued by the control module, and enabling the control module to acquire a sampling result; and
a signal output terminal configured to transmit the sampling result to a data transmit terminal of the image output device based on the command of the control module.

4. The device as claimed in claim 3, wherein the image output test device further comprises a sample conversion module connected between the control module and the signal output terminal for converting the sampling result transmitted to the signal output terminal into a transmission interface format matching with the image output device.

5. The device as claimed in claim 4, wherein the video conversion module converts the S-Video Y/C signal into the RGB565 signal by sampling the RGB565 signal at the center of each scan line based on the output position of horizontal synchronous output signal as well as the vertical reference signal, and skip the portion between the vertical blank areas.

6. The device as claimed in claim 5, wherein the image output device is a main board of a notebook computer connected to at least a hard disk, a memory, a display panel, a CPU, and a graphics card, wherein the image output terminal of the image output device is a S-Video connector and the data transmit terminal of the image output device and the signal output terminal of the image output test device are a USB connector respectively.

* * * * *